US012304207B2

(12) United States Patent
Kajihara

(10) Patent No.: US 12,304,207 B2
(45) Date of Patent: May 20, 2025

(54) PRINTING APPARATUS AND INK DISCHARGE HEAD MAINTENANCE METHOD

(71) Applicant: SCREEN HOLDINGS CO., LTD., Kyoto (JP)

(72) Inventor: Kaisei Kajihara, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 178 days.

(21) Appl. No.: 18/018,799

(22) PCT Filed: Aug. 20, 2021

(86) PCT No.: PCT/JP2021/030539

§ 371 (c)(1),
(2) Date: Jan. 30, 2023

(87) PCT Pub. No.: WO2022/064916

PCT Pub. Date: Mar. 31, 2022

(65) Prior Publication Data

US 2023/0311512 A1 Oct. 5, 2023

(30) Foreign Application Priority Data

Sep. 23, 2020 (JP) ................................ 2020-158432

(51) Int. Cl.
*B41J 2/165* (2006.01)

(52) U.S. Cl.
CPC ....... *B41J 2/16511* (2013.01); *B41J 2/16523* (2013.01); *B41J 2/16514* (2024.05)

(58) Field of Classification Search
CPC ......................... B41J 2/16511; B41J 2/16523; B41J 2/16514; B41J 2/16517; B41J 2/01; B41J 2/16544; B41J 2/16547
See application file for complete search history.

(56) References Cited

U.S. PATENT DOCUMENTS 9,481,176 B2 11/2016 Nakano
2007/0252865 A1* 11/2007 Sakurai ............... B41J 2/16508 347/29

(Continued)

FOREIGN PATENT DOCUMENTS

JP 2006-240235 A 9/2006
JP 2007-290264 A 11/2007

(Continued)

OTHER PUBLICATIONS

Yoda Kazuhisa, “Liquid Discharge Device” (JP 2019104124 A), 2019 Jun. 2019, Description of Embodiments (Year: 2019).*

(Continued)

*Primary Examiner* — Lisa Solomon
(74) *Attorney, Agent, or Firm* — Rimon P.C.

(57) ABSTRACT

The seal member can be held in close contact with the head unit by being elastically deformed according to the shape of the head unit including the head (seal close contact operation). Accordingly, the drying of the nozzles can be prevented by isolating the nozzles inside the seal members from the atmosphere outside the seal members. Further, the cap can be brought into contact with the head unit while the seal member is separated from the head unit (cap contact operation). In this cap contact operation, the cap in contact with the head unit allow air flows between the outside and inside of the cap. At the time of purging, the cap contact operation is performed, whereby the cap is caused to face the nozzles and the ink flowing out from the nozzles is received by the cap.

6 Claims, 12 Drawing Sheets

(56) References Cited

U.S. PATENT DOCUMENTS

| | | | |
|---|---|---|---|
| 2012/0056932 | A1 | 3/2012 | Matsubara et al. |
| 2013/0215189 | A1 | 8/2013 | Justice et al. |
| 2016/0200106 | A1 | 7/2016 | Nakano |

FOREIGN PATENT DOCUMENTS

| | | | | |
|---|---|---|---|---|
| JP | 2012-51303 | A | | 3/2012 |
| JP | 2015-080913 | A | | 4/2015 |
| JP | 2019104124 | A | * | 6/2019 |

OTHER PUBLICATIONS

International Search Report issued in corresponding International Application No. PCT/JP2021/030539 dated Nov. 2, 2021, w/ English Translation (5 pages).

* cited by examiner

<PRE-WIPING EXECUTION MODE>

<MOVEMENT EXECUTION MODE>

PRINTING APPARATUS AND INK DISCHARGE HEAD MAINTENANCE METHOD

CROSS REFERENCE TO RELATED APPLICATIONS

This application is the U.S. National Phase under 35 U.S.C. § 371 of International Application No. PCT/JP2021/030539, filed on Aug. 20, 2021, which claims the benefit of Japanese Application No. 2020-158432, filed on Sep. 23, 2020, the entire contents of each are hereby incorporated by reference.

TECHNICAL FIELD

This invention relates to a technique for performing maintenance for an ink discharge head.

BACKGROUND ART

Various types of maintenance are performed by a maintenance unit to prevent nozzle clogging for an ink discharge head for discharging an ink from a nozzle. For example, the nozzle is isolated from an outside atmosphere by being covered from below by a cap of the maintenance unit to prevent the drying of the nozzle while printing is stopped. Further, to forcibly discharge the solidified ink from the nozzle, purging is appropriately performed to cause the ink to flow out from the nozzle (patent literature 1). Also in this purging, the maintenance unit covers the nozzle from below by the cap to receive the ink flowing out from the nozzle by the cap.

CITATION LIST

Patent Literature

Patent literature 1: JP 2006-240235A

SUMMARY OF INVENTION

Technical Problem

To prevent the drying of the nozzle, it is preferable to isolate the nozzle from the outside atmosphere by sealing the nozzle by the cap. On the other hand, if purging is performed with the nozzle sealed by the cap in this way, a pressure inside the cap has become excessive and the ink has been ejected from the cap in some cases.

This invention was developed in view of the above problem and aims to enable nozzle clogging to be prevented while avoiding ink ejection associated with purging.

Solution to Problem

A printing apparatus according to the invention, comprises: a head unit including a head that discharges an ink from a nozzle; a base member facing the head unit from below, a cap supported by the base member movably upward and downward, the cap facing the head from below, a biasing member that biases the cap upward with respect to the base member; a close-contact member arranged on the base member to surround the cap from outside; and an interval changer that changes an interval between the head unit and the base member, the interval changer performing: a first operation of elastically deforming the close-contact member according to shape of the head unit and holding the close-contact member in close contact with the head unit by setting the interval between the head unit and the base member to a first interval while resisting against a biasing force of the biasing member with the cap held in contact with the head unit from below; and a second operation of bringing the cap into contact with the head unit from below by the biasing force of the biasing member with the head unit and the close-contact member separated by setting the interval between the head unit and the base member to a second interval wider than the first interval, the close-contact member held in close contact with the head unit by the first operation isolating the nozzle inside the close-contact member from an atmosphere outside the close-contact member by blocking a flow of a gas between the outside and inside of the close-contact member, the cap held in contact with the head unit by the second operation allowing a gas flow between the outside and inside of the cap, and the interval changer performing the second operation when purging is performed to cause the ink to flow out from the nozzle, whereby the ink flowing out from the nozzle is received by the cap while the cap is caused to face the nozzle.

A printing head maintenance method according to the invention, comprises: performing a first operation of elastically deforming a close-contact member arranged on a base member to surround a cap from outside according to shape of a head unit and holding the close-contact member in close contact with the head unit by setting an interval between the head unit and the base member to a first interval while resisting against a biasing force of a biasing member biasing the cap upward with respect to the base member with the cap held in contact with the head unit, the cap being supported movably upward and downward by the base member facing from below the head unit including a head discharging an ink from a nozzle, the cap facing the head from below; and performing a second operation of bringing the cap into contact with the head unit from below by the biasing force of the biasing member with the head unit and the close-contact member separated by setting the interval between the head unit and the base member to a second interval wider than the first interval, the close-contact member held in close contact with the head unit by the first operation isolating the nozzle inside the close-contact member from an atmosphere outside the close-contact member by blocking a flow of a gas between the outside and inside of the close-contact member, the cap held in contact with the head unit by the second operation allowing the gas flow between the outside and inside of the cap, and the cap being caused to face the nozzle and receive the ink flowing out from the nozzle by performing the second operation when purging is performed to cause the ink to flow out from the nozzle.

The invention (printing apparatus, printing head maintenance method) thus configured is provided with the close-contact member arranged to surround the cap from outside, separately from the cap facing from below the head discharging the ink from the nozzle. By elastically deforming the close-contact member according to the shape of the head unit including the head, the first operation of bringing the close-contact member into close contact with the head unit can be performed. Accordingly, the drying of the nozzle can be prevented by isolating the nozzle inside the close-contact member from the atmosphere outside the close-contact member. Further, the second operation of bringing the cap into contact with the head unit while separating the close-contact member from the head unit can be performed. The cap held in contact with the head unit by this second operation allows the gas flow between the outside and inside of the cap. At the time of purging, the second operation is performed, whereby the cap is caused to face the nozzle and the ink flowing out from the nozzle is received by the cap. Therefore, the ink can be prevented from being ejected from the cap due to an excessive pressure inside the cap. In this way, in the invention, the clogging of the nozzle can be prevented while ink ejection associated with purging is avoided.

The printing apparatus may further comprise a purge guide blade fixed to the cap, wherein: the purge guide blade contacts the head to block the ink having reached the purge guide blade along the head after flowing out from the nozzle by the execution of purging during the execution of the second operation, whereas the purge guide blade is separated from the head during the execution of the first operation. In such a configuration, the purge guide blade contacts the head while purging is performed (i.e. during the execution of the second operation). Accordingly, the ink flowing out from the nozzle by purging can be prevented from spreading to contaminate each apparatus component by the purge guide blade. Further, the purge guide blade is separated from the head during the execution of the first operation. Therefore, the ink adhering to the purge guide blade can be prevented from being solidified and contaminating the head as a result of keeping the purge guide blade in contact with the head after purging is finished.

The printing apparatus may configured so that the cap is provided with a communication hole allowing communication between the outside and inside of the cap. In such a configuration, the ink can be prevented from being ejected from the cap by avoiding an excessive pressure inside the cap by the gas flow via the communication hole.

The printing apparatus may be configured so that the cap held in contact with the head unit by the second operation is not held in close contact with the head unit and a gap is formed between the cap and the head unit, and the gas flows between the outside and inside of the cap via the gap. In such a configuration, the ink can be prevented from being ejected from the cap by avoiding an excessive pressure inside the cap by the gas flow via the gap between the cap and the head unit.

Note that various materials are considered as a material of the cap not to be held in close contact with the head unit. Therefore, the printing apparatus may be configured so that at least a part configured to contact the head unit, out of the cap, is made of resin.

Effect of Invention

As described above, according to the invention, nozzle clogging can be prevented while ink ejection associated with purging is avoided.

DESCRIPTION OF EMBODIMENTS

Figure 1:
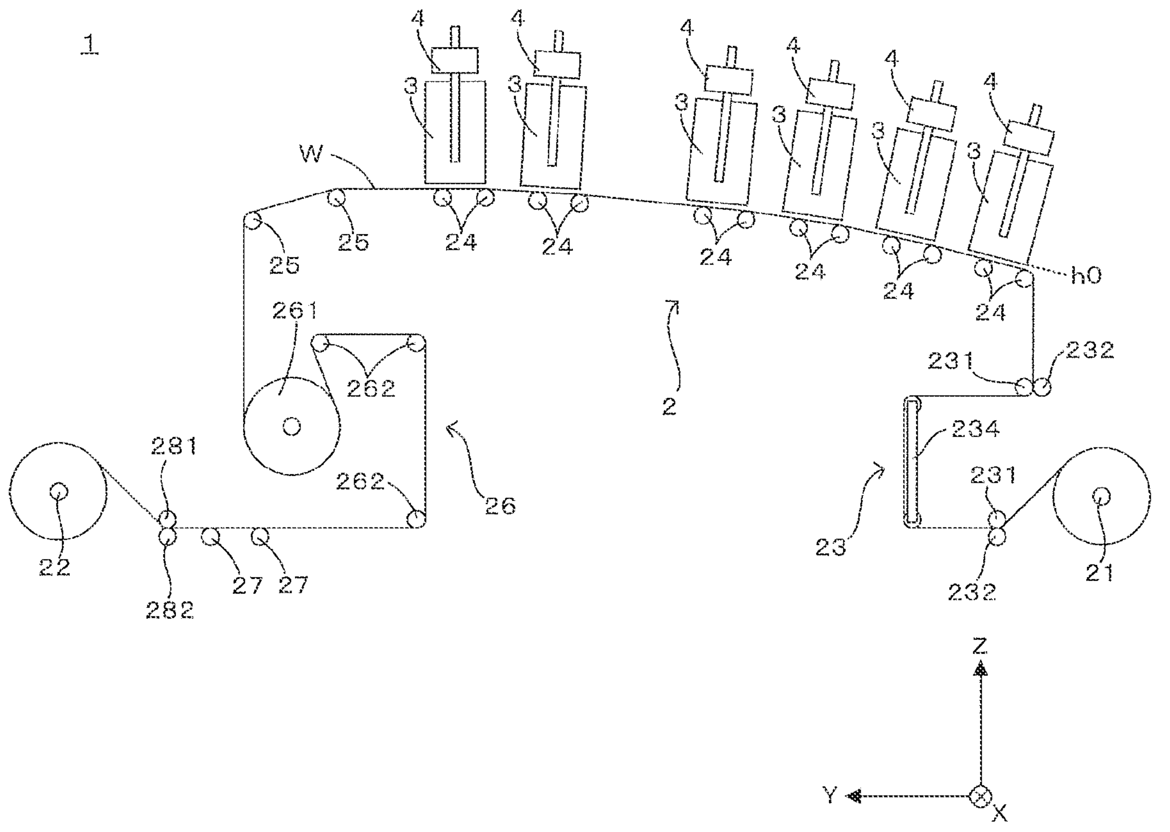
FIG. 1 is a front view schematically showing an example of a printing apparatus according to the invention.
Figure 2:
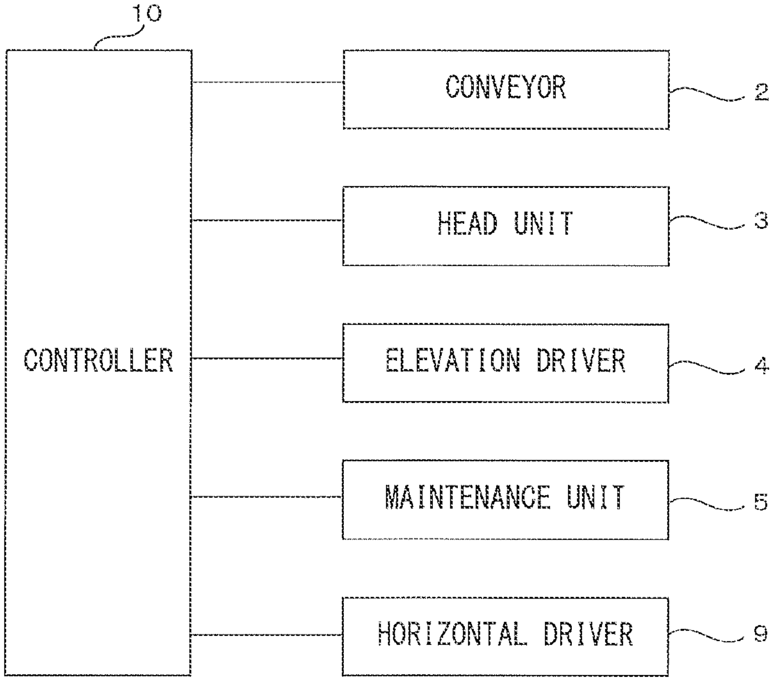
FIG. 2 is a block diagram showing an electrical configuration of the printing apparatus of FIG. 1.

FIG. 1 is a front view schematically showing an example of a printing apparatus according to the invention, and FIG. 2 is a block diagram showing an electrical configuration of the printing apparatus of FIG. 1. In FIG. 1 and subsequent figures, an X direction, which is a horizontal direction, a Y direction, which is a horizontal direction orthogonal to the X direction, and a Z direction, which is a vertical direction, are shown as appropriate. The printing apparatus 1 prints images on a web W by discharging inks to the web W in an ink-jet method while conveying the web W in the form of an elongated strip in a roll-to-roll manner. A material of the web W is paper or film and the web W is flexible. The printing apparatus 1 is provided with a controller 10 that integrally controls the entire apparatus, and a control required to print images on the web W is executed by the controller 10. This controller 10 is constituted by a processor such as a CPU (Central Processing Unit).

The printing apparatus 1 includes a conveyor 2 that conveys the web W. The conveyor 2 includes a feeding roller 21 and a take-up roller 22, and the web W is conveyed in a roll-to-roll manner by the take-up roller 22 taking up the web W fed by the feeding roller 21. This conveyor 2 includes a take-in unit 23 for taking in the web W fed from the feeding roller 21 between the feeding roller 21 and the take-up roller 22. The take-in unit 23 includes two drive rollers 231, two nip rollers 232 and an edge position adjuster 234 provided between the two drive rollers 231. Each drive roller 231 drives the web W wound thereon by being rotated by a drive force of a motor. The two nip rollers 232 are respectively provided to correspond to the two drive rollers 231, and the web W is sandwiched between each nip roller 232 and the corresponding drive roller 231. The edge position adjuster 234 adjusts the position of an end of the web W in the X direction, which is a width direction of the web W.

Further, the conveyor 2 includes a plurality of support rollers 24 for supporting the web W between the take-in unit 23 and the take-up roller 22. These support rollers 24 convey the web W in the Y direction while supporting the web W, to which the inks are discharged by the ink-jet method, from below. Particularly, the plurality of support rollers 24 are obliquely arrayed so that the support roller 24 more on a downstream side in a conveying direction (Y direction) of the web W is located at a higher position. Therefore, the web W conveyed by these support rollers 24 is obliquely conveyed to ascend in the Y direction.

Further, the conveyor 2 includes a plurality of support rollers 25 for supporting the web W between the support rollers 24 and the take-up roller 22 and a dryer 26 arranged between these support rollers 25 and the take-up roller 22.

The dryer 26 includes a heat drum 261 and support rollers 262 for supporting the web W moving from the heat drum 261 toward the take-up roller 22. The heat drum 261 is rotationally driven according to the conveyance of the web W and dries the web W by heating the web W by a built-in heater. Further, the conveyor 2 includes a plurality of support rollers 27 for supporting the web W moving from the dryer 26 toward the take-up roller 22. Furthermore, the conveyor 2 includes a drive roller 281 and a nip roller 282 arranged between these support rollers 27 and the take-up roller 22. The drive roller 281 drives the web W wound thereon by being rotated by a drive force of a motor. The web W is sandwiched between the nip roller 282 and the drive roller 281.

Figure 3:
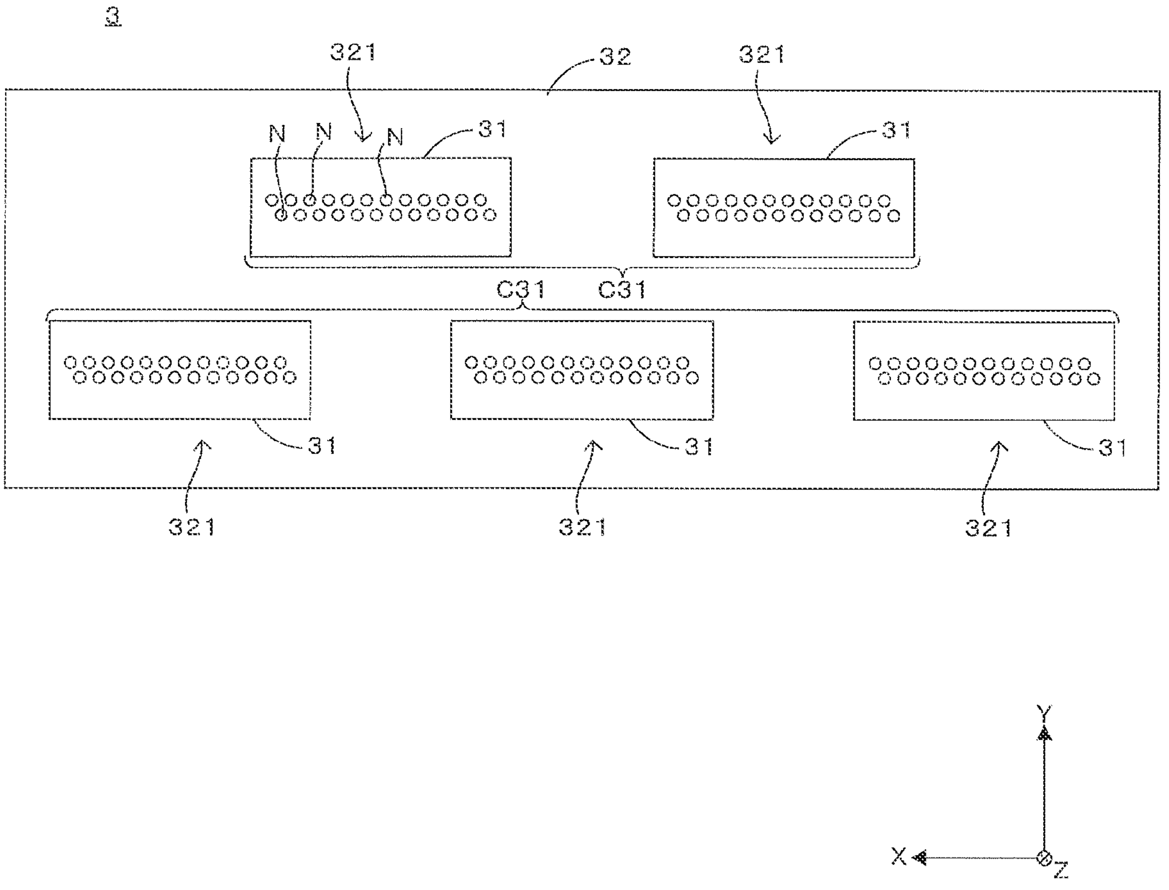
FIG. 3 is a bottom view schematically showing the configuration of the head unit.

The printing apparatus 1 includes a plurality of (six) head units 3 (FIG. 3) facing the web W supported by the plurality of support rollers 24 from above. FIG. 3 is a bottom view schematically showing the configuration of the head unit. The head unit 3 includes a plurality of (five) heads 31. The plurality of heads 31 are arrayed in two rows in a staggered manner in the X direction, in other words, a head row C31 composed of three head units 3 arrayed in parallel to the X direction and a head row C31 composed of two head units 3 arrayed in parallel to the X direction are provided in the Y direction. In each head 31, a plurality of nozzles N are arranged in a staggered manner in the X direction to face the web W from above, and each nozzle N discharges the ink to the web W by the ink-jet method. This head unit 3 includes a head holding member 32 for holding the respective heads 31. The head holding member 32 includes a plurality of head insertion holes 321 provided to correspond to the plurality of heads 31, and the plurality of heads 31 are fixed to the head holding member 32 while being inserted in the corresponding head insertion holes 321. Such a head holding member 32 can be constituted by a non-elastic member made of metal or resin.

As shown in FIG. 1, the posture of each of the plurality of head units 3 is set according to the inclination of the web W supported by the plurality of support rollers 24. That is, the respective head units 3 are so arranged that the head unit 3 more on an upstream side in the conveying direction of the web W, out of the plurality of head units 3, is more largely inclined with respect to the Z direction. However, the head unit 3 most downstream in the conveying direction (Y direction) of the web W is horizontally arranged and not inclined with respect to the Z direction, and the head units 3 other than this most downstream head unit 3 are inclined to be higher in the conveying direction of the web W. Note that the inclination of the head unit 3 can be evaluated by an angle of the bottom surfaces of the heads 31 formed with the nozzles N with respect to the Z direction.

The plurality of head units 3 respectively discharge the inks of mutually different colors including yellow, magenta, cyan and black from the nozzles N in response to a command from the controller 10. In this way, a color image can be printed on the web W. However, the number of the head units 3 and the colors of the inks are not limited to those in this example.

Further, the printing apparatus 1 is provided with a plurality of elevation drivers 4 respectively provided to correspond to the plurality of head units 3. Each elevation driver 4 can locate the head unit 3 at any one of a plurality of positions having mutually different heights by elevating or lowering the corresponding head unit 3 in response to a command from the controller 10. In FIG. 1, each head unit 3 is located at a print height h0 closest to the web W. Such an elevation driver 4 can be realized by a known specific configuration and can be configured to elevate and lower the head unit 3, for example, by driving a ball screw, an eccentric cam or the like by a motor.

The printing apparatus 1 is further provided with maintenance units 5 (FIG. 4) that performs maintenance for the head units 3 and horizontal drivers 9 that drives the maintenance units 5 in a horizontal direction (X direction). This maintenance unit 5 performs maintenance for the head unit 3 by being moved in the X direction, which is a cleaning direction, by the horizontal driver 9. The maintenance unit 5 and the horizontal driver 9 are provided for each of the plurality of head units 3. The horizontal driver 9 can be, for example, constituted by a rail extending in the X direction for supporting the maintenance unit 5 and a linear motor for driving the maintenance unit 5 in the X direction. Further, a mechanism for rotating a pulley wound with a belt mounted in the maintenance unit 5 by a motor or a ball screw for linearly moving the maintenance unit 5 may be used instead of the linear motor. Next, the maintenance unit 5 is described in detail.

Figure 4:
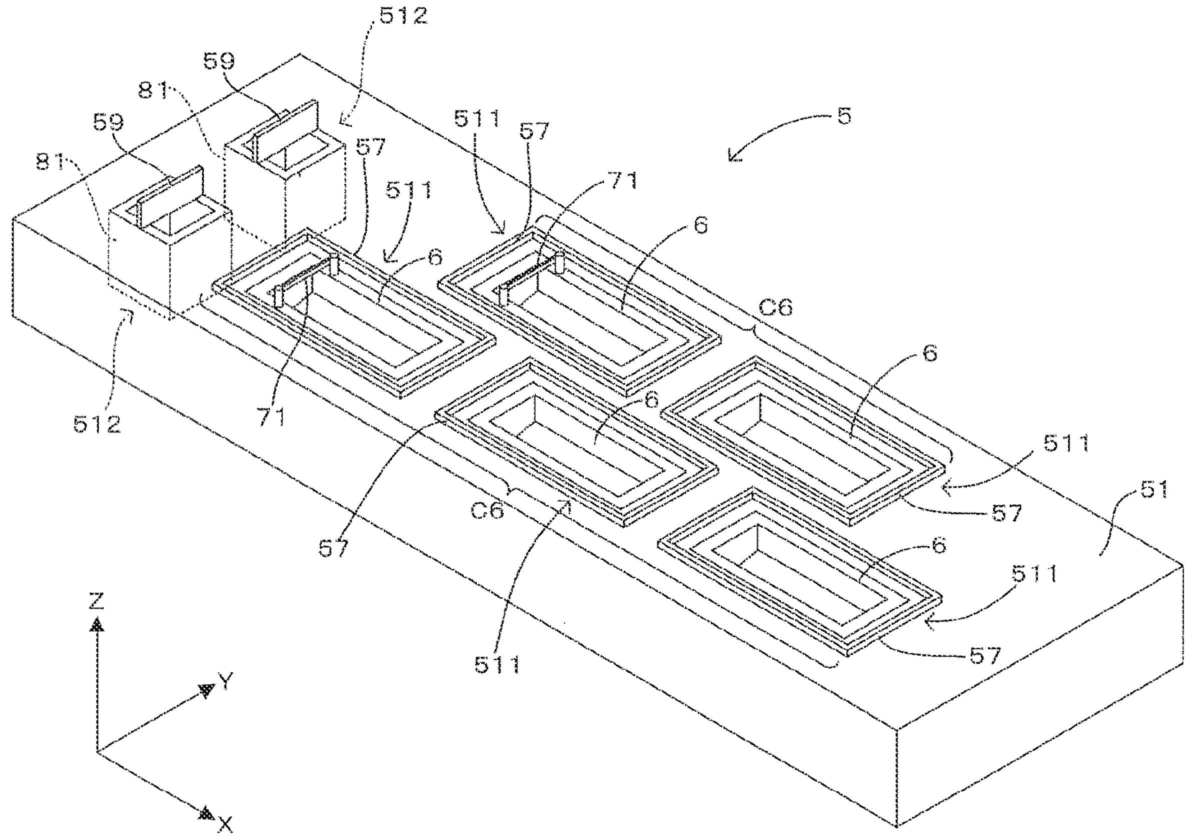
FIG. 4 is a perspective view schematically showing the configuration of the maintenance unit.

FIG. 4 is a perspective view schematically showing the configuration of the maintenance unit. As described above, the maintenance unit 5 is provided for each of the plurality of head units 3 and facing the corresponding head unit 3 from below. At this time, the maintenance unit 5 is also obliquely arranged according to the inclination of the head unit 3. However, since the inclination of the maintenance unit 5 is slight, the inclination of the maintenance unit 5 is not reflected in FIG. 4 and subsequent figures. Further, since a plurality of the maintenance units 5 provided to correspond to the plurality of head units 3 have a common configuration, one maintenance unit 5 is described.

The maintenance unit 5 includes a base member 51 having a rectangular parallelepiped shape elongated in the X direction, and the horizontal driver 9 (FIG. 2) drives the base member 51 in the X direction while supporting the base member 51. This base member 51 is provided with cap insertion holes 511 having a rectangular parallelepiped shape elongated in the X direction and open upward. The maintenance unit 5 includes a plurality of the cap insertion holes 511 in correspondence with the plurality of heads 31 of the head unit 3 to which the maintenance unit 5 faces. In this way, the plurality of cap insertion holes 511 are arrayed in two rows in the X direction in a staggered manner.

Further, the maintenance unit 5 includes caps 6 respectively fit in the plurality of cap insertion holes 511. As just described, the maintenance unit 5 includes a plurality of the caps 6 in correspondence with the plurality of heads 31 of the head unit 3 to which the maintenance unit 5 faces, and each cap 6 is facing the corresponding head 31 from below to receive the ink falling down from this head 31. The plurality of caps 6 are arrayed in two rows in the X direction in a staggered manner, in other words, a cap row C6 composed of three caps 6 arrayed in parallel to the X direction and a cap row C6 composed of two caps 6 arrayed in parallel to the X direction are provided in the Y direction.

Furthermore, the maintenance unit 5 includes pre-wipers 7. Particularly, the pre-wipers 7 are provided for the caps 6 most upstream in the cleaning direction (X direction) of the plurality of caps 6 belonging to the cap rows C6. On the other hand, no pre-wiper 7 is provided for the caps 6 other than the most upstream ones. Each pre-wiper 7 scrapes off the ink from the heads 31 as described later.

The maintenance unit 5 includes seal members 57 arranged on the upper surface of the base member 51. The seal member 57 is a frame body having a rectangular parallelepiped shape in a plan view from the Z direction, and arranged for each of the plurality of caps 6. This seal member 57 projects to a predetermined height from the upper surface of the base member 51 and surrounds the corresponding cap 6 from outside in the plan view. Further, the pre-wiper 7 arranged for the cap 6 is similarly surrounded from outside by the seal member 57 in the plan view. This seal member 57 is constituted by an elastic member made of rubber, silicon or the like, and elastically deformed according to an external force. Note that a similar seal member may be disposed along an edge part of a flat surface of the base member 51.

Further, the maintenance unit 5 includes main wipers 59 each constituted by an elastically deformable elastic member made of rubber, silicon or the like. The main wiper 59 is a blade in the form of a flat plate extending in parallel to the Y direction, and stands from the upper surface of the base member 51. The main wiper 59 is provided to correspond to each of a plurality of (two) cap rows C6, and each main wiper 59 is arranged on an upstream side in the X direction (cleaning direction) of the corresponding cap row C6. In this way, a plurality of (two) main wipers 59 are arrayed in the Y direction on an upstream end in the X direction of the base member 51. Each main wiper 59 scrapes off the ink from the heads 31 as described later.

Furthermore, the maintenance unit 5 includes tank mounting parts 512 respectively arranged for the plurality of main wipers 59. This tank mounting part 512 is a hole formed in the base member 51, open upward and located below the corresponding main wiper 59, and a waste liquid container 81 is inserted in each tank mounting part 512. In this way, the waste liquid container 81 is arranged below each of the plurality of main wipers 59. Each waste liquid container 81 is a box-shaped tank open upward and facing the corresponding main wiper 59 from below. Such a waste liquid container 81 stores the ink scraped off by the main wiper 59 and falling down from the main wiper 59. Note that the waste liquid container 81 needs not be a box body and may be a pan for receiving the ink.

Figure 5:
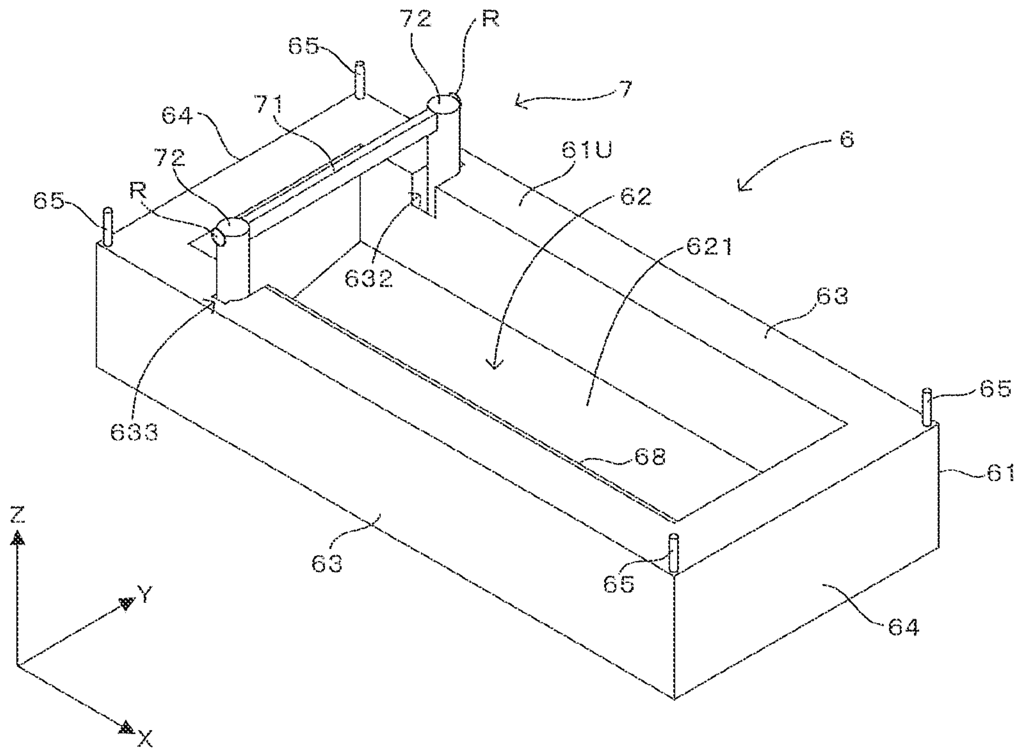
FIG. 5 is a perspective view schematically showing the configurations of the pre-wiper and the cap.
Figure 6:
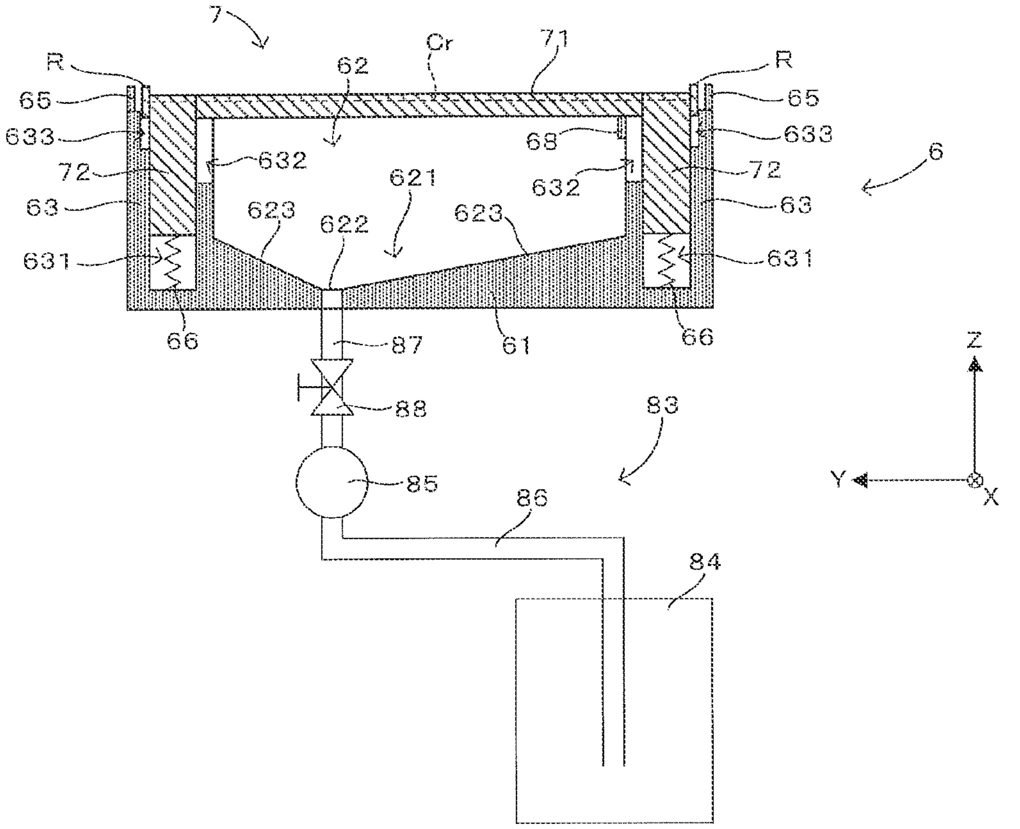
FIG. 6 is a view schematically showing cross-sections of the pre-wiper and the cap and an ink discharge mechanism connected to the cap.

FIG. 5 is a perspective view schematically showing the configurations of the pre-wiper and the cap, and FIG. 6 is a view schematically showing cross-sections of the pre-wiper and the cap and an ink discharge mechanism connected to the cap. The cap 6 includes a cap body 61 having a rectangular parallelepiped shape elongated in the X direction. The cap body 61 is made of resin and less likely to be elastically deformed as compared to the above elastic member. The cap body 61 is provided with a recess 62 open upward. In a plan view, the recess 62 has a rectangular parallelepiped shape, and an upper surface 61U of the cap body 61 surrounding the recess 62 is a flat surface. The cap body 61 has a pair of side walls 63 defining the recess 62 from the Y direction and a pair of side walls 64 defining the recess 62 from the X direction, and each side wall 63 of the cap 6 is provided with an insertion hole 631. This insertion hole 631 has a hollow cylindrical shape extending in the Z direction and is open upward in the Z direction. Further, each side wall 63 is formed with a cut 632 linking an upper end part of the insertion hole 631 and the recess 62 and a cut 633 provided from the insertion hole 631 toward a side opposite to the recess 62.

A discharge port 622 penetrates through a bottom surface 621 of the recess 62 in the Z direction, and the bottom surface 621 of the recess 62 is constituted by a slope 623 descending toward the bottom surface 621 from the side wall 63 in the Y direction. Accordingly, the ink falling down to the bottom surface 621 descends along the slope 623 and reaches the discharge port 622. Further, the cap 6 includes positioning projections 65 projecting upward from the upper surface 61U of the cap body 61 on four corners of the upper surface 61U.

The pre-wiper 7 includes a wiper blade 71 extending in parallel to the Y direction. The wiper blade 71 may be constituted by an elastic member made of rubber, silicone or the like or may be made of resin, metal or the like. The wiper blade 71 is arranged across the recess 62 of the cap body 61 in the Y direction, and the upper surface (upper end) of the wiper blade 71 is parallel to the Y direction. The wiper blade 71 is eccentrically arranged near an upstream end in the X direction of the recess 62. This wiper blade 71 is arranged at a position separated from the upstream end (side) of the recess 62 by a predetermined distance toward a downstream side in the X direction, and facing the recess 62 from above. In this way, the ink scraped off by the wiper blade 71 can be reliably received by the recess 62.

Further, the pre-wiper 7 includes two support columns 72 supporting the wiper blade 71 from both sides in the Y direction. The support column 72 has a cylindrical shape extending in the Z direction, and two support columns 72 are respectively inserted into two insertion holes 631 provided in the cap body 61. Such a support column 72 can be elevated and lowered in the Z direction with respect to the insertion hole 631. Further, the cap 6 includes compression springs 66 (biasing members) arranged between the bottom surfaces of the support columns 72 and the bottom surfaces of the insertion holes 631, and the support columns 72 are biased upward with respect to the cap body 61 by the compression springs 66.

Rollers R rotatable about an axis of rotation Cr parallel to the Y direction are mounted on this pre-wiper 7. The roller R is rotatably mounted on an outer side (side opposite to the wiper blade 71 in the Y direction) of the support column 72, and projects upward by a predetermined amount from the upper surface of the wiper blade 71. Such a roller R is mounted on each of the two support columns 72, and projects further upward than the upper end of each support column 72. That is, the roller R projects further upward than the pre-wiper 7 (wiper blade 71 and support columns 72). Such a roller R is, for example, constituted by a rotary member such as a miniature bearing.

Further, the maintenance unit 5 includes a purge guide blade 68 extending in parallel to the X direction. The purge guide blade 68 is an elastic member made of rubber, silicon or the like and fixed to an inner wall of the recess 62 of the cap 6 (i.e. a wall surface of the side wall 63 defining the recess 62). The purge guide blade 68 is arranged downstream of the wiper blade 71 in the X direction, and the wiper blade 71 and the purge guide blade 68 do not overlap in a plan view from the Z direction. This purge guide blade 68 is provided to prevent the ink adhering to the bottom surface of the head 31 from spreading along this bottom surface due to the inclination of the head 31, and provided on a lower end, out of both ends in the Y direction of the head 31. That is, the purge guide blade 68 is provided on the inner wall surface of the lower side wall 63, out of two side walls 63 provided to correspond to both ends in the Y direction of the head 31, and projects slightly further upward than the upper surface (i.e. upper surface 61U) of this side wall 63.

In a state shown in FIG. 5, the respective support columns 72 are caused to project upward from the insertion holes 631 by biasing forces (elastic forces) of the compression springs 66, and the wiper blade 71 is located above the upper surface 61U of the cap body 61 and the upper ends of the positioning projections 65. On the other hand, if the pre-wiper 7 is pushed down against the biasing forces of the compression springs 66, the respective support columns 72 are stored into the insertion holes 631. Further, each roller R is stored in the cut 633, and each of the both ends of the wiper blade 71 is stored in the cut 632. As a result, the pre-wiper 7 and the rollers R are located at the same height or lower than the upper surface 61U of the cap body 61 and do not project from the upper surface 61U.

Further, as shown in FIG. 6, the printing apparatus 1 is provided with an ink discharge mechanism 83 that discharges the ink from the recesses 62 of the caps 6. The ink discharge mechanism 83 includes a waste liquid container 84, a pump 85, a pipe 86 connecting the waste liquid container 84 and the pump 85, a flexible pipe 87 connecting the discharge port 622 and the pump 85 and an electromagnetic valve 88 disposed in the pipe 87. Accordingly, the ink having reached the discharge port 622 is discarded into the waste liquid container 84 by the pump 85. The waste liquid container 84, the pump 85 and the pipe 86 are provided commonly for the plurality of (five) caps 6 of the maintenance unit 5, and the pipe 87 provided for each of the plurality of caps 6 is connected to the pump 85. However, the ink discharge mechanism 84 may be provided for each of the plurality of caps 6.

Next, a maintenance execution mode for the head unit 3 by the maintenance unit 5 is described. This maintenance is performed by the elevation driver 4 controlling the position of the head unit 3 and the horizontal driver 9 controlling the position of the maintenance unit 5 in response to a command of the controller 10. Since the maintenance execution modes by the plurality of maintenance units 5 are common, one maintenance unit 5 is described here.

Figure 7:
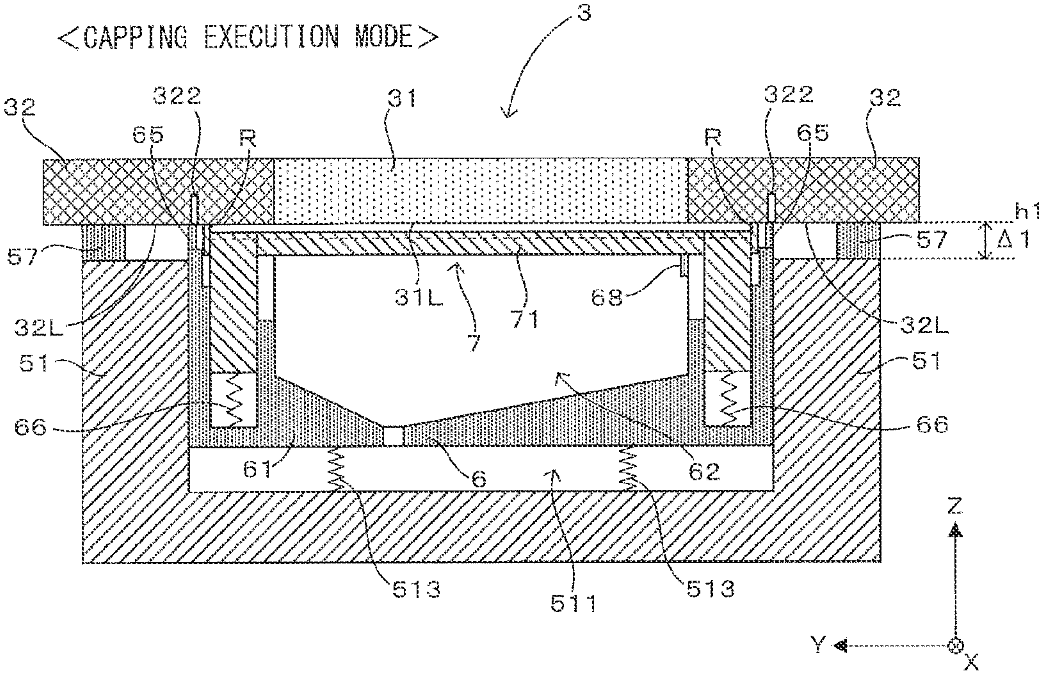
FIG. 7 is a partial sectional view schematically showing a capping execution mode by the maintenance unit.
Figure 8:
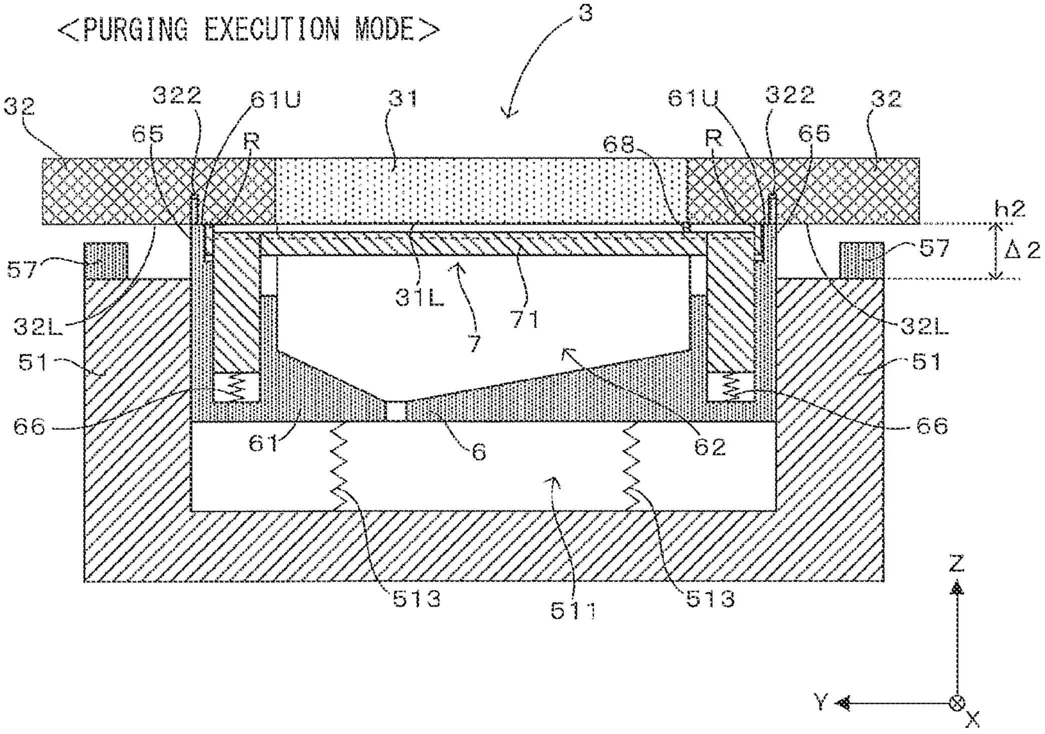
FIG. 8 is a partial sectional view schematically showing a purging execution mode by the maintenance unit.
Figure 9:
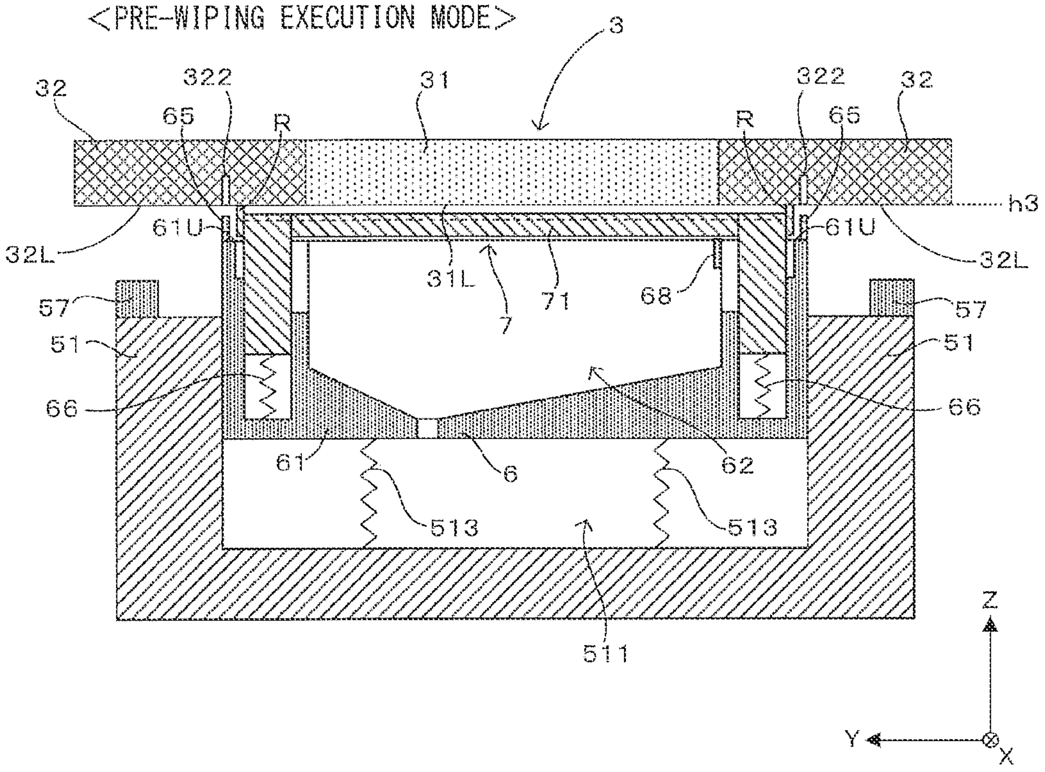
FIG. 9 is a partial sectional view schematically showing a pre-wiping execution mode by the maintenance unit.
Figure 10:
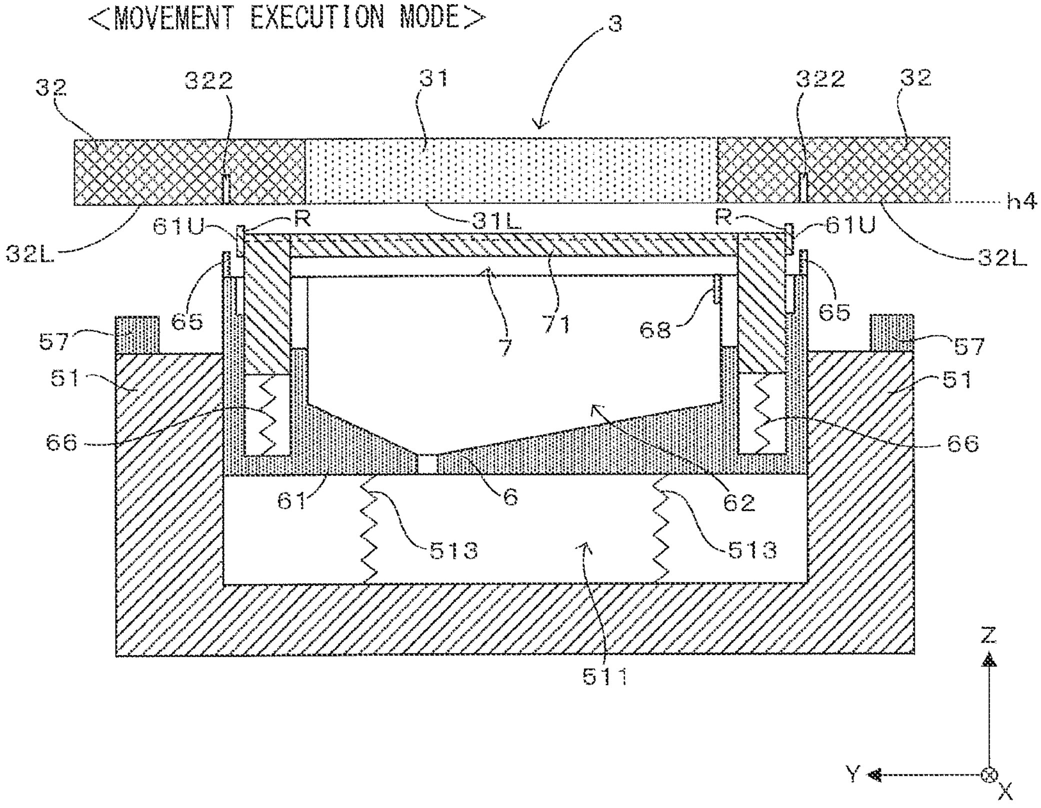
FIG. 10 is a partial sectional view schematically showing a movement execution mode by the maintenance unit.

FIG. 7 is a partial sectional view schematically showing a capping execution mode by the maintenance unit, FIG. 8 is a partial sectional view schematically showing a purging execution mode by the maintenance unit, FIG. 9 is a partial sectional view schematically showing a pre-wiping execution mode by the maintenance unit and FIG. 10 is a partial sectional view schematically showing a movement execution mode by the maintenance unit.

As described above, the elevation driver 4 elevates and lowers the head unit 3. In this way, the head unit 3 is located at any one of the print height h0 (FIG. 1), a capping height h1 (FIG. 7) higher than the print height h0, a purging height h2 (FIG. 8) higher than the capping height h1, a pre-wiping height h3 (FIG. 9) higher than the purging height h2 and a movement height h4 (FIG. 10) higher than the pre-wiping height h3. Note that, as shown in FIGS. 7 to 10, a bottom surface 31L of the head 31 and a bottom surface 32L of the head holding member 32 are both flat surfaces and arranged flush with each other. Further, the heights h1 to h4 of the head unit 3 are represented by the heights of the bottom surfaces 31L, 32L (i.e. bottom surface of the head unit 3).

If the head unit 3 is located at any one of the heights h1 to h4, the maintenance unit 5 can be located between the head unit 3 and the web W. On the other hand, if the head unit 3 is located at the print height h0, the maintenance unit 5 cannot be located between the head unit 3 and the web W. Thus, the horizontal driver 9 retracts the maintenance unit 5 from the web W in the X direction.

As shown in these figures, the bottom surface 32L of the head holding member 32 is provided with positioning holes 322 extending in the Z direction and open downward. The positioning projections 65 of the cap 6 are insertable into these positioning holes 322 from below. Four positioning holes 322 are provided to correspond to the four positioning projections 65 provided on the four corners. This positioning hole 322 is longer than the positioning projection 65. Further, the cap 6 can be elevated and lowered in the Z direction with respect to the cap insertion hole 511 of the base member 51. Compression springs 513 (biasing members) are arranged between the bottom surface of the cap 6 and the bottom surface of the cap insertion hole 511, and the cap 6 is biased upward with respect to the base member 51 by the compression springs 513.

During capping shown in FIG. 7, the plurality of caps 6 of the maintenance unit 5 are respectively facing the plurality of heads 31 of the head unit 3 from below. The head unit 3 is located at the capping height h1, and the bottom surface 32L of the head holding member 32 of the head unit 3 is in contact with the seal members 57 from above. The seal member 57 is elastically deformed according to the shape of the bottom surface 32L of the head holding member 32 to which the seal member 57 is contacting and held in close contact with this bottom surface 32L. In this way, a gap between the bottom surface 32L of the head holding member 32 and the seal members 57 is eliminated, and the bottom surface 31L of the head 31 and the nozzles N, which present inside the seal member 57 in a bottom view, are sealed by the seal member 57. In this way, the seal member 57 held in close contact with the head unit 3 blocks air flows between the inside and outside of the seal member 57 and isolate the nozzles N inside the seal member 57 from an atmosphere outside the seal member 57. That is, in a bottom view, the head 31 is located inside the seal member 57 and blocked from outside air by the seal member 57 held in close contact with the head unit 3.

The positions of the positioning projections 65 and those of the positioning holes 322 are slightly shifted, and the positioning projections 65 are not fit into the positioning holes 322. Such a positional relationship of the positioning projections 65 and the positioning holes 322 can be realized by adjusting the positions of the caps 6 by the horizontal driver 9. As a result, the upper ends of the positioning projections 65 are pressed against the bottom surface of the head holding member 32 at the capping height h1 from below by biasing forces of the compression springs 513. Therefore, the cap bodies 61 are located lower than the bottom surface 32L of the head holding member 32 by lengths of the positioning projections 65, and the purge guide blades 68 are separated downward from the bottom surfaces 31L of the heads 31.

Further, the rollers R mounted on the pre-wiper 7 are pressed against the bottom surface 32L of the head holding member 32 at the capping height h1 from below by biasing forces of the compression springs 66. As a result, an interval equivalent to a height difference between the rollers R and the wiper blade 71 is present between the head 31 and the wiper blade 71. During a standby period or the like in which the printing apparatus 1 stop printing, the controller 10 causes the head units 3 and the maintenance units 5 to perform an operation shown in FIG. 7 to retain the moisture of the nozzles N of the heads 31.

During purging shown in FIG. 8, the plurality of caps 6 of the maintenance unit 5 are respectively facing the plurality of heads 31 of the head unit 3 from below. The head unit 3 is located at the purging height h2 and separated upward from the seal members 57. The positions of the positioning projections 65 and those of the positioning holes 322 match and the positioning projections 65 are fit into the positioning holes 322 from below. As a result, the cap body 61 of the cap 6 is closer to the head unit 3 than during capping of FIG. 7, and the upper surface 61U of the cap body 61 of the cap 6 are in contact with the bottom surface 32L of the head holding member 32. Since the cap body 61 of the cap 6 is made of resin, the cap body 61 is not elastically deformed unlike the seal member 57. Therefore, with the upper surface 61U of the cap body 61 held in contact with the bottom surface 32L of the head holding member 32, a tiny gap is present between the upper surface 61U of the cap body 61 and the bottom surface 32L of the head holding member 32. That is, the cap 6 in contact with the head holding member 32 allow air flows between the inside and outside of the cap 6 via this gap.

Further, the purge guide blade 68 mounted in the cap body 61 of the cap 6 contact the bottom surface 31L of the head 31. Particularly, the purge guide blade 68 is elastically deformed according to this contact, and the upper end of the purge guide blade 68 enters the tiny gap between the bottom surface 31L of the head 31 and the bottom surface 32L of the head holding member 32. Note that the upper end of the purge guide blade 68 may contact outer peripheral edge part of the bottom surface 31L of the heads 31.

Further, the rollers R mounted on the pre-wiper 7 are pressed against the bottom surface 32L of the head holding member 32 at the purging height h2 from below by the biasing forces of the compression springs 66. As a result, an interval equivalent to a height difference between the rollers R and the wiper blade 71 is present between the head 31 and the wiper blade 71.

When purging is performed to prevent the clogging of the nozzles N of the heads 31, the controller 10 causes the head unit 3 and the maintenance unit 5 to perform an operation shown in FIG. 8. Purging is performed by causing the ink to flow out from the nozzles N for a predetermined time by applying a pressure to the ink stored in the head 31. On the other hand, the recess 62 of the cap 6 in contact with the head holding member 32 is facing the head 31 from below and receive the ink flowing out from the nozzles N of the head 31. The ink received into the recess 62 in this way is collected into the waste liquid container 84.

During pre-wiping shown in FIG. 9, the head unit 3 is located at the pre-wiping height h3. The pre-wiping height h3 is higher than a highest point, to which the cap 6 can be elevated by the biasing forces of the compression springs 513, the positioning projections 65 come out downward from the positioning holes 322 and the head unit 3 and the caps 6 are separated in the Z direction. Associated with this, the purge guide blade 68 is also separated downward from the head unit 3.

Further, the rollers R mounted on the pre-wiper 7 are pressed against the bottom surface 32L of the head holding member 32 at the pre-wiping height h3 from below by the biasing forces of the compression springs 66. As a result, an interval equivalent to a height difference between the rollers R and the wiper blade 71 is present between the head 31 and the wiper blade 71. During the execution of pre-wiping to be described later, the controller 10 causes the head unit 3 and the maintenance unit 5 to perform an operation shown in FIG. 9 and the ink scraped off from the head 31 by the pre-wipers 7 is received by the recess 62 of the cap 6.

During a movement shown in FIG. 10, the head unit 3 is located at the movement height h4. The movement height h4 is higher than a highest point, to which the rollers R mounted on the pre-wiper 7 can be elevated by the biasing forces of the compression springs 66, and the head unit 3 is separated from the rollers R and the pre-wiper 7 in the Z direction. Of course, the head unit 3 is also separated from the cap 6 and the purge guide blade 68 in the Z direction. For example, when the maintenance unit 5 is moved between the head unit 3 and the web W after the execution of pre-wiping, the controller 10 causes the head unit 3 and the maintenance unit 5 to perform an operation shown in FIG. 10. In this way, the interference of the head unit 3 and the maintenance unit 5 can be avoided.

Figure 11:
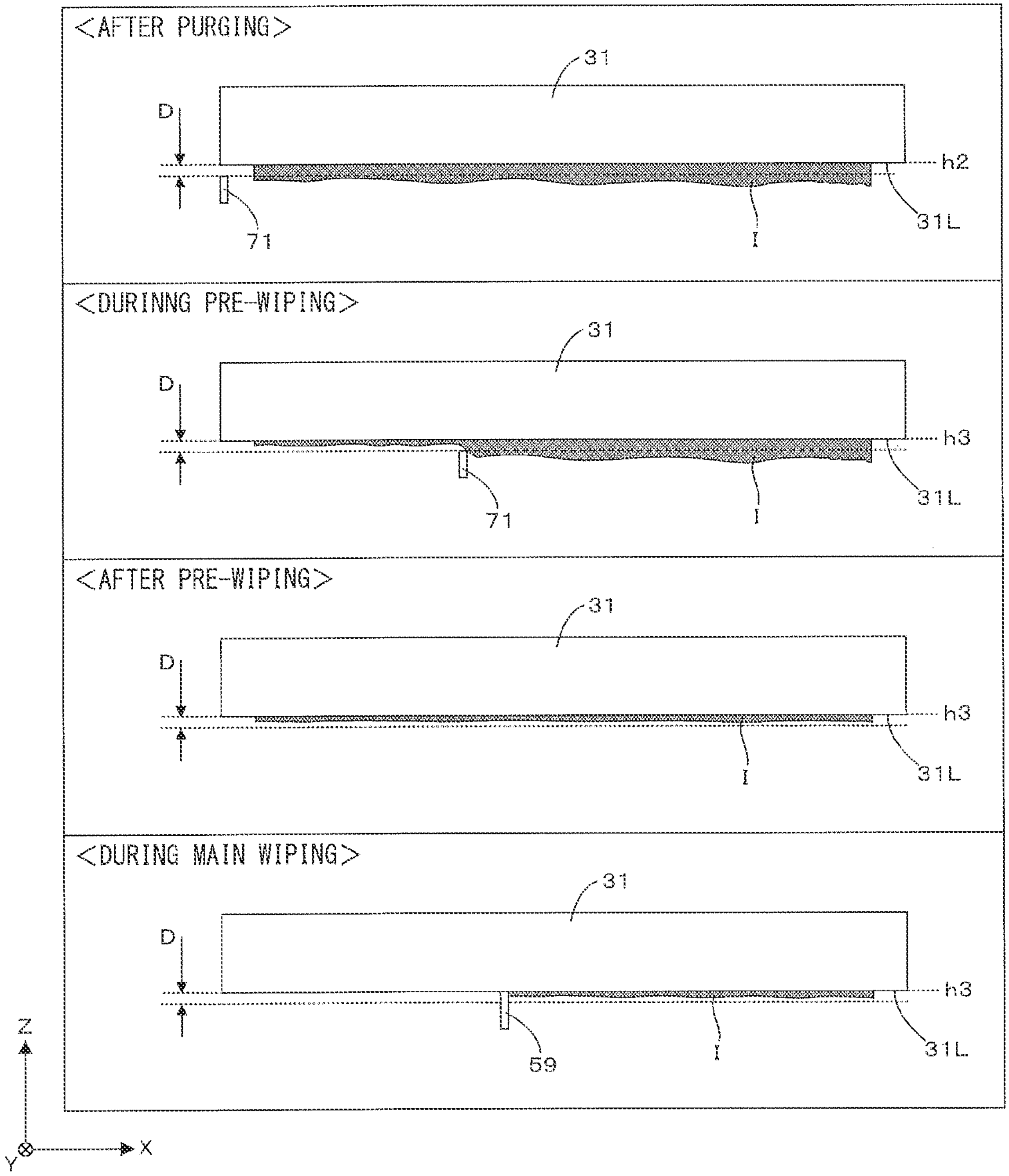
FIG. 11 is a chart schematically showing an operation flow of the maintenance unit.

FIG. 11 is a chart schematically showing an operation flow of the maintenance unit. When the heads 31 perform purging, the controller 10 locates the head unit 3 at the purging height h2 while causing the plurality of caps 6 of the maintenance unit 5 to respectively face the plurality of heads 31 (FIG. 8). At this time, the wiper blades 71 of the pre-wipers 7 and the main wipers 59 are stopped upstream of the plurality of heads 31 of each head unit 3 in the X direction (cleaning direction). By this purging, a large amount of the ink I adheres to the bottom surfaces 31L of the heads 31 ("After Purging" in FIG. 11).

If purging is completed, the controller 10 performs pre-wiping by starting a movement of the maintenance unit 5 in the X direction while locating the head unit 3 at the pre-wiping height h3 (FIG. 9). In this way, the wiper blades 71 at an interval D from the bottom surfaces 31L of the heads 31 in the Z direction pass below the bottom surfaces 31L of the heads 31 to scrape off the ink I adhering to the bottom surfaces 31L of the heads 31 ("During Pre-Wiping" of FIG. 11). As described above, the interval D is specified by the rollers R, specifically, set to about 0.5 mm, which is nearly equal to a diameter of an ink droplet. In this way, the ink I scraped off by the wiper blades 71 is collected into the waste liquid container 84 after falling down into the recesses 62 of the caps 6.

At this time, the two wiper blades 71 provided in the maintenance unit 5 scrape off the ink from the respective heads 31 while passing below the respective heads 31 in the head rows C31 arranged on the downstream side in the X direction. That is, the common wiper blade 71 scrapes off the ink for the plurality of heads 31 belonging to the same head row C31. By the execution of this pre-wiping, lower end parts of the ink I adhering to the bottom surfaces 31L of the heads 31 are removed ("After Pre-Wiping" of FIG. 11).

Also after pre-wiping is completed, a movement of the maintenance unit 5 in the X direction is continued. As a result, the main wipers 59 reach the heads 31 and the upper ends of the main wipers 59 slide against the bottom surfaces 31L of the heads 31 ("During Main Wiping" of FIG. 11). That is, the main wipers 59 scrape off the ink I adhering to the bottom surfaces 31L of the heads 31 by moving in the X direction with respect to the bottom surfaces 31L of the heads 31 while contacting the bottom surfaces 31L of the heads 31 from below. At this time, similarly to the wiper blade 71, the common main wiper 59 scrapes off the ink I for the plurality of heads 31 belonging to the same head row C31. In this way, the ink I scraped off by the main wipers 59 falls down from the main wipers 59 and is collected into the waste liquid containers 81 provided below the main wipers 59.

In the embodiment described above, the seal member 57 (close-contact member) surrounding the cap 6 from outside is provided separately from the cap 6 facing from below the head 31 for discharging the ink I from the nozzles N. A seal close contact operation (first operation) of FIG. 7 for covering the head 31 by holding the seal member 57 in close contact with the head unit 3 and a cap contact operation (second operation) of FIG. 8 for covering the head 31 by bringing the cap 6 into contact with the head unit 3 can be performed. Each of these operations is performed by the elevation driver 4 elevating or lowering the head unit 3 to change the interval in the Z direction between the head unit 3 and the base member 51.

That is, in the seal close contact operation of FIG. 7, the elevation driver 4 brings the seal member 57 into contact with the bottom surface 32L of the head holding member 32 by setting the interval in the Z direction between the head unit 3 and the base member 51 to an interval Δ1 (first interval) while resisting biasing forces of the compression springs 513 (biasing members) with the caps 6 held in contact with the head holding member 32 of the head unit 3 from below. In this way, the seal member 57 is elastically deformed according to the shape of the bottom surface 32L of the head holding member 32 and held in close contact with the bottom surface 32L of the head holding member 32. Further, in the cap contact operation of FIG. 8, the elevation driver 4 brings the cap 6 into contact with the bottom surface 32L of the head holding member 32 of the head unit 3 by the biasing forces of the compression springs 513 with the head unit 3 and the seal member 57 separated in the Z direction by setting the interval in the Z direction between the head unit 3 and the base member 51 to an interval Δ2 (second interval) wider than the interval Δ1.

As just described, the seal member 57 can be held in close contact with the head unit 3 by being elastically deformed according to the shape of the head unit 3 including the head 31 (seal close contact operation). Accordingly, the drying of the nozzles N can be prevented by isolating the nozzles N inside the seal members 57 from the atmosphere outside the seal members 57. Further, the cap 6 can be brought into contact with the head unit 3 while the seal member 57 is separated from the head unit 3 (cap contact operation). In this cap contact operation, the cap 6 in contact with the head unit 3 allow air flows between the outside and inside of the cap 6. At the time of purging, the cap contact operation is performed, whereby the cap 6 is caused to face the nozzles N and the ink I flowing out from the nozzles N is received by the cap 6. Therefore, the ink I can be prevented from being ejected from the cap 6 due to an excessive pressure inside the cap 6. In this way, in this embodiment, the clogging of the nozzles N can be prevented while the ejection of the ink I associated with purging is avoided.

Further, the purge guide blade 68 fixed to the cap 6 is provided. During the execution of the cap contact operation, the purge guide blade 68 contacts the head 31, thereby blocking the ink I having reached the purge guide blade 68 along the head after flowing out from the nozzles N by an execution of purging. On the other hand, during the execution of the seal close contact operation, the purge guide blade 68 is separated from the head 31. In such a configuration, the purge guide blade 68 is in contact with the head 31 during an execution of purging (i.e. during the execution of the cap contact operation). Therefore, the contamination of each apparatus component due to the spread of the ink I flowing out from the nozzles N by purging can be prevented by the purge guide blade 68. Further, the purge guide blade 68 is separated from the head 31 during the execution of the seal close contact operation. Therefore, the ink I adhering to the purge guide blade 68 can be prevented from being solidified and contaminating the head 31 as a result of keeping the parge guide blade 68 to be in contact with the heads 31 after purging is finished.

Further, the cap 6 held in contact with the head unit 3 by the cap contact operation is not in close contact with the head unit 3 and a tiny gap is formed between the cap 6 and the head unit 3. Air flows between the outside and inside of the cap 6 via this gap. In such a configuration, the ink I can be prevented from being ejected from the cap 6 by avoiding an excessive pressure inside the cap 6 by air flows via the tiny gap between the cap 6 and the head unit 3.

In the embodiment described above, the printing apparatus 1 corresponds to an example of a "printing apparatus" of the invention, the head unit 3 corresponds to an example of a "head unit" of the invention, the head 31 corresponds to an example of a "head" of the invention, the elevation driver 4 corresponds to an example of an "interval changer" of the invention, the base member 51 corresponds to an example of a "base member" of the invention, the compression spring 513 corresponds to an example of a "biasing member" of the invention, the seal member 57 corresponds to an example of a "close-contact member" of the invention, the cap 6 corresponds to an example of a "cap" of the invention, the purge guide blade 68 corresponds to an example of a "purge guide blade" of the invention, the ink I corresponds to an example of an "ink" of the invention, the nozzle N corresponds to an example of a "nozzle" of the invention, the interval Δ1 corresponds to an example of a "first interval" of the invention, the interval Δ2 corresponds to an example of a "second interval" of the invention, the seal close contact operation of FIG. 7 corresponds to an example of a "first operation" of the invention, and the cap contact operation of FIG. 8 corresponds to an example of a "second operation" of the invention.

Note that the invention is not limited to the embodiment described above and various changes other than the aforementioned ones can be made without departing from the gist of the invention. For example, the cap 6 can be variously modified. That is, the cap body 61 of the cap 6 is made of resin in the above example. However, the entire cap body 61 needs not be made of resin, and a tiny gap can be formed between the upper surface 61U and the head unit 3 by making at least the upper surface 61U (part for contacting the head unit 3) of the cap body 61 of resin. Alternatively, the cap body 61 may be made of a material other than the resin.

Figure 12:
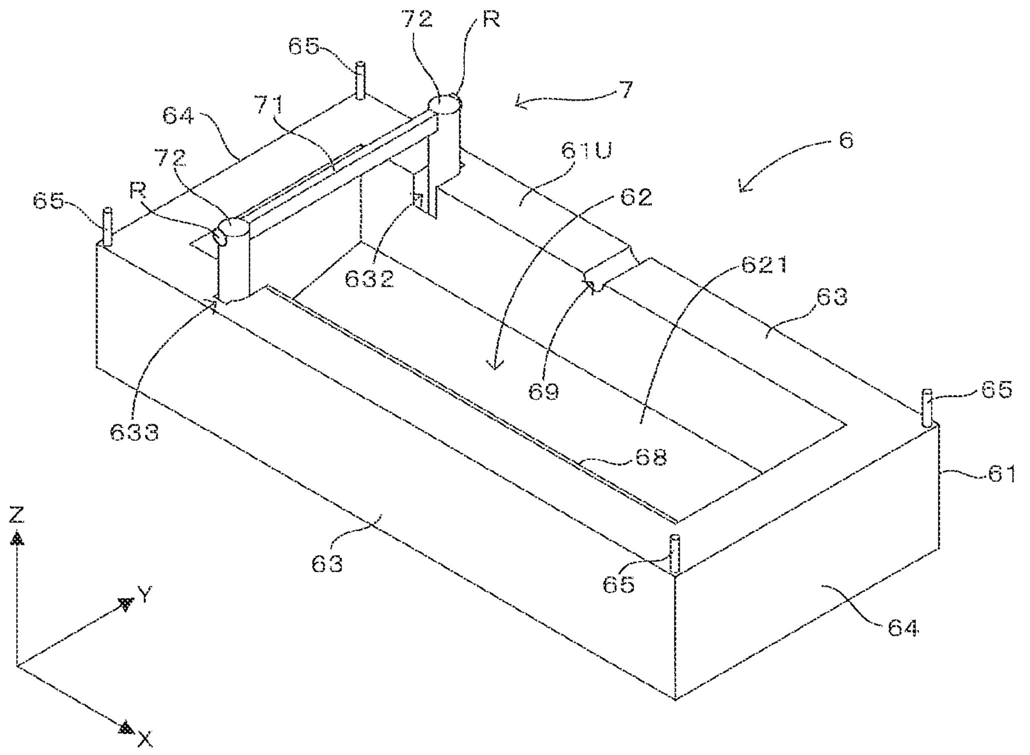
FIG. 12 is a perspective view schematically showing a modification of the cap.

Further, the cap 6 may be configured as shown in FIG. 12. FIG. 12 is a perspective view schematically showing a modification of the cap. In the modification of FIG. 12, a communication hole 69 is formed in the upper surface 61U of the cap 6. The communication hole 69 is a cut provided in the upper surface 61U and extends in parallel to the Y direction. This communication hole 69 is provided in the side wall 63 opposite to the side wall 63 arranged with the purge guide blade 68, out of the two side walls 63 of the cap body 61, and allows communication between the inside (i.e. recess 62) of the cap 6 and the outside of the cap 6.

In the case of performing the cap contact operation of FIG. 8 using such a cap 6, the communication hole 69 of the cap 6 allows communication between the outside and inside of the cap 6 while the cap 6 in contact with the head unit 3 is covering the head 31 from below. In such a configuration, the ink I can be prevented from being ejected from the cap 6 by avoiding an excessive pressure inside the cap 6 by an air flow via the communication hole 69. In the case of providing such a communication hole 69, the communication hole 69 may be constituted by an elastic member.

Further, a specific configuration of the communication hole 69 is not limited to the cut of FIG. 12. Accordingly, a cylindrical hole penetrating through the side wall 63 without being open in the upper surface 61U of the cap body 61 may be provided as the communication hole 69. Further, the orientation, shape, size or number of the communication hole(s) 69 may be changed as appropriate.

Further, although an execution order of the seal close contact operation (FIG. 7) and the cap contact operation (FIG. 8) is not particularly limited in the above embodiment, these operations can be performed in an appropriate order.

For example, the cap contact operation may be performed in association with purging and the seal close contact operation may be performed when purging is completed. In such a configuration, moisture can be retained by the seal close contact operation for the heads 31 having the clogging of the nozzles N eliminated by purging.

Further, the number of the head units 3 provided in the printing apparatus 1 and the number of the heads 31 provided in the head unit 3 may be changed as appropriate. According to this, the number of the maintenance units 5 and the number of the caps 6 provided in the maintenance unit 5 may also be changed as appropriate.

Further, the shape of the cap 6 in a plan view is not limited to a rectangular parallelepiped and may be a polygonal, elliptical or circular shape. The same applies to the shape of the seal member 57.

INDUSTRIAL APPLICABILITY

The invention is applicable to techniques in general for performing maintenance for an ink discharging head.

REFERENCE SIGNS LIST

1 . . . printing apparatus
3 . . . head unit
31 . . . head
4 . . . elevation driver (interval changer)
51 . . . base member
513 . . . compression spring (biasing member)
57 . . . seal member (close-contact member)
6 . . . cap
68 . . . purge guide blade
I . . . ink
N . . . nozzle
Δ1 . . . interval (first interval)
Δ2 . . . interval (second interval)

The invention claimed is:

1. A printing apparatus, comprising:
a head unit including a head that discharges an ink from a nozzle;
a base member facing the head unit from below;
a cap supported by the base member movably upward and downward, the cap facing the head from below;
a biasing member that biases the cap upward with respect to the base member;
a close-contact member arranged on the base member to surround the cap from outside; and
an interval changer that changes an interval between the head unit and the base member in a vertical direction,
the interval changer performing:
a first operation of elastically deforming the close-contact member according to shape of the head unit and holding the close-contact member in close contact with the head unit by setting the interval between the head unit and the base member in a vertical direction to a first interval while resisting against a biasing force of the biasing member with the cap held in contact with the head unit from below; and
a second operation of bringing the cap into contact with the head unit from below by the biasing force of the biasing member with the head unit and the close-contact member separated by setting the interval between the head unit and the base member in a vertical direction to a second interval wider than the first interval,
the close-contact member held in close contact with the head unit by the first operation isolating the nozzle inside the close-contact member from an atmosphere outside the close-contact member by blocking a flow of a gas between the outside and inside of the close-contact member,
the cap held in contact with the head unit by the second operation allowing a gas flow between the outside and inside of the cap, and
the interval changer performing the second operation when purging is performed to cause the ink to flow out from the nozzle by applying a pressure to the ink stored in the head, whereby the ink flowing out from the nozzle is received by the cap while the cap is caused to face the nozzle.

2. A printing apparatus comprising:
a head unit including a head that discharges an ink from a nozzle;
a base member facing the head unit from below;
a cap supported by the base member movably upward and downward, the cap facing the head from below;
a biasing member that biases the cap upward with respect to the base member;
a close-contact member arranged on the base member to surround the cap from outside; and
an interval changer that changes an interval between the head unit and the base member, and
a purge guide blade fixed to the cap,
the interval changer performing:
a first operation of elastically deforming the close-contact member according to shape of the head unit and holding the close-contact member in close contact with the head unit by setting the interval between the head unit and the base member to a first interval while resisting against a biasing force of the biasing member with the cap held in contact with the head unit from below; and
a second operation of bringing the cap into contact with the head unit from below by the biasing force of the biasing member with the head unit and the close-contact member separated by setting the interval between the head unit and the base member to a second interval wider than the first interval,
the close-contact member held in close contact with the head unit by the first operation isolating the nozzle inside the close-contact member from an atmosphere outside the close-contact member by blocking a flow of a gas between the outside and inside of the close-contact member,
the cap held in contact with the head unit by the second operation allowing a gas flow between the outside and inside of the cap,
the interval changer performing the second operation when purging is performed to cause the ink to flow out from the nozzle, whereby the ink flowing out from the nozzle is received by the cap while the cap is caused to face the nozzle, and
the purge guide blade contacts the head to block the ink having reached the purge guide blade along the head after flowing out from the nozzle by the execution of purging during the execution of the second operation, whereas the purge guide blade is separated from the head during the execution of the first operation.

3. The printing apparatus according to claim 1, wherein the cap is provided with a communication hole allowing communication between the outside and inside of the cap.

4. The printing apparatus according to claim 1, wherein:

the cap held in contact with the head unit by the second operation is not held in close contact with the head unit and a gap is formed between the cap and the head unit, and the gas flows between the outside and inside of the cap via the gap.

5. The printing apparatus according to claim 4, wherein at least a part configured to contact the head unit, out of the cap, is made of resin.

6. A printing head maintenance method, comprising:

performing a first operation of elastically deforming a close-contact member arranged on a base member to surround a cap from outside according to shape of a head unit and holding the close-contact member in close contact with the head unit by setting an interval between the head unit and the base member in a vertical direction to a first interval while resisting against a biasing force of a biasing member biasing the cap upward with respect to the base member with the cap held in contact with the head unit, the cap being supported movably upward and downward by the base member facing from below the head unit including a head discharging an ink from a nozzle, the cap facing the head from below; and performing a second operation of bringing the cap into contact with the head unit from below by the biasing force of the biasing member with the head unit and the close-contact member separated by setting the interval between the head unit and the base member in a vertical direction to a second interval wider than the first interval, the close-contact member held in close contact with the head unit by the first operation isolating the nozzle inside the close-contact member from an atmosphere outside the close-contact member by blocking a flow of a gas between the outside and inside of the close-contact member, the cap held in contact with the head unit by the second operation allowing the gas flow between the outside and inside of the cap, and the cap being caused to face the nozzle and receive the ink flowing out from the nozzle by performing the second operation when purging is performed to cause the ink to flow out from the nozzle by applying a pressure to the ink stored in the head.

* * * * *